(12) United States Patent
Zhang et al.

(10) Patent No.: US 7,869,207 B2
(45) Date of Patent: Jan. 11, 2011

(54) SLIDING MECHANISM FOR SLIDE-TYPE PORTABLE ELECTRONIC DEVICE

(75) Inventors: Yu Zhang, Shenzhen (CN); Guo-Zhao Huang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 106 days.

(21) Appl. No.: 12/417,769

(22) Filed: Apr. 3, 2009

(65) Prior Publication Data

US 2009/0268383 A1    Oct. 29, 2009

(30) Foreign Application Priority Data

Apr. 28, 2008   (CN) .................. 2008 1 0301356

(51) Int. Cl.
*G06F 1/16* (2006.01)
(52) U.S. Cl. .................. 361/679.55; 312/334.2; 720/623; 248/588; 360/85
(58) Field of Classification Search ............ 361/679.55, 361/679.01, 679.06, 679.45, 679.49, 679.31, 361/679.59, 679.5, 679.37, 679.57; 455/575.4, 455/162.1; 312/319.1, 9.9, 334.22, 224; 227/180.1, 175.2; 720/604, 623, 630, 608; 248/425, 429, 588, 166, 354.7; 360/99.06, 360/85, 92.1
See application file for complete search history.

(56) References Cited

U.S. PATENT DOCUMENTS

| | | | | |
|---|---|---|---|---|
| 5,752,757 A | * | 5/1998 | Choi | 312/319.1 |
| 2007/0279847 A1 | * | 12/2007 | Li et al. | 361/679 |
| 2009/0323278 A1 | * | 12/2009 | Lu | 361/679.55 |
| 2010/0022286 A1 | * | 1/2010 | Wang et al. | 455/575.4 |
| 2010/0089192 A1 | * | 4/2010 | Peng et al. | 74/100.1 |

* cited by examiner

*Primary Examiner*—Hung V Duong

(74) *Attorney, Agent, or Firm*—Steven M. Reiss

(57) ABSTRACT

A sliding mechanism includes a main board, a sliding board, two racks, a gear, a connecting member and a winding coil. The main board defines a guiding slot. The two racks are positioned at two opposite sides of the main board. The gear matches each of the first and second racks. The sliding board is slidable along the guiding slot by the connecting member. The winding coil, the winding coil is tightened when the sliding board is pushed toward or away from the main board, and rebounds to its original shape to cause the sliding board to automatically further slide relative to the main board when the gear is detached from one rack and matches another rack.

20 Claims, 7 Drawing Sheets

SLIDING MECHANISM FOR SLIDE-TYPE PORTABLE ELECTRONIC DEVICE

BACKGROUND

1. Technical Field

The present invention relates to sliding mechanisms for slidably connecting two members, to a sliding mechanism configured (i.e., structured and arranged) for use in a slide-type portable electronic device to slidably interconnect two casings of a device.

2. Description of Related Art

Slide-type portable electronic devices have become increasingly popular. A typical slide-type portable electronic device is configured to have a cover and a housing. The cover slides over the housing, thus enabling opening/closing of the portable electronic device by means of a sliding mechanism.

Conventional sliding mechanism for slide-type portable electronic device comprises a lot of elements, which increases cost of manufacture and difficulty of assembling the portable electronic device. In addition, the conventional sliding mechanism generally includes a torsional spring. Considering the compact size of the portable electronic device, a diameter of the torsional spring should be small. However, the torsional spring with a small diameter has poor fatigue strength, and is easily failure in repeat use.

Therefore, there is space for improvement within the art.

BRIEF DESCRIPTION OF THE DRAWINGS

Many aspects of the sliding mechanism can be better understood with reference to the following drawings. The components in the drawings are not necessarily drawn to scale, the emphasis instead being placed upon clearly illustrating the principles of the present sliding mechanism, in which.

DETAILED DESCRIPTION OF THE EMBODIMENTS

Figure 1:
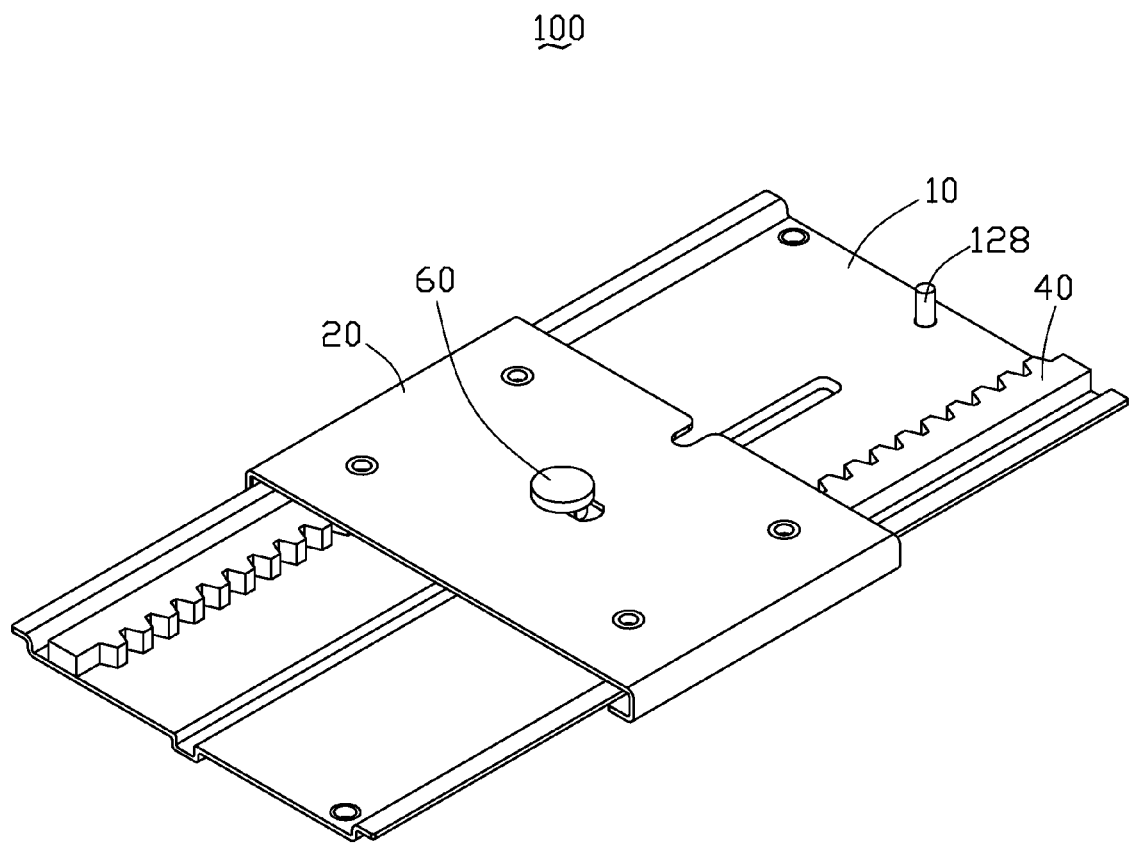
FIG. 1 is an assembled, schematic view of a sliding mechanism, in accordance with an exemplary embodiment.
Figure 2:
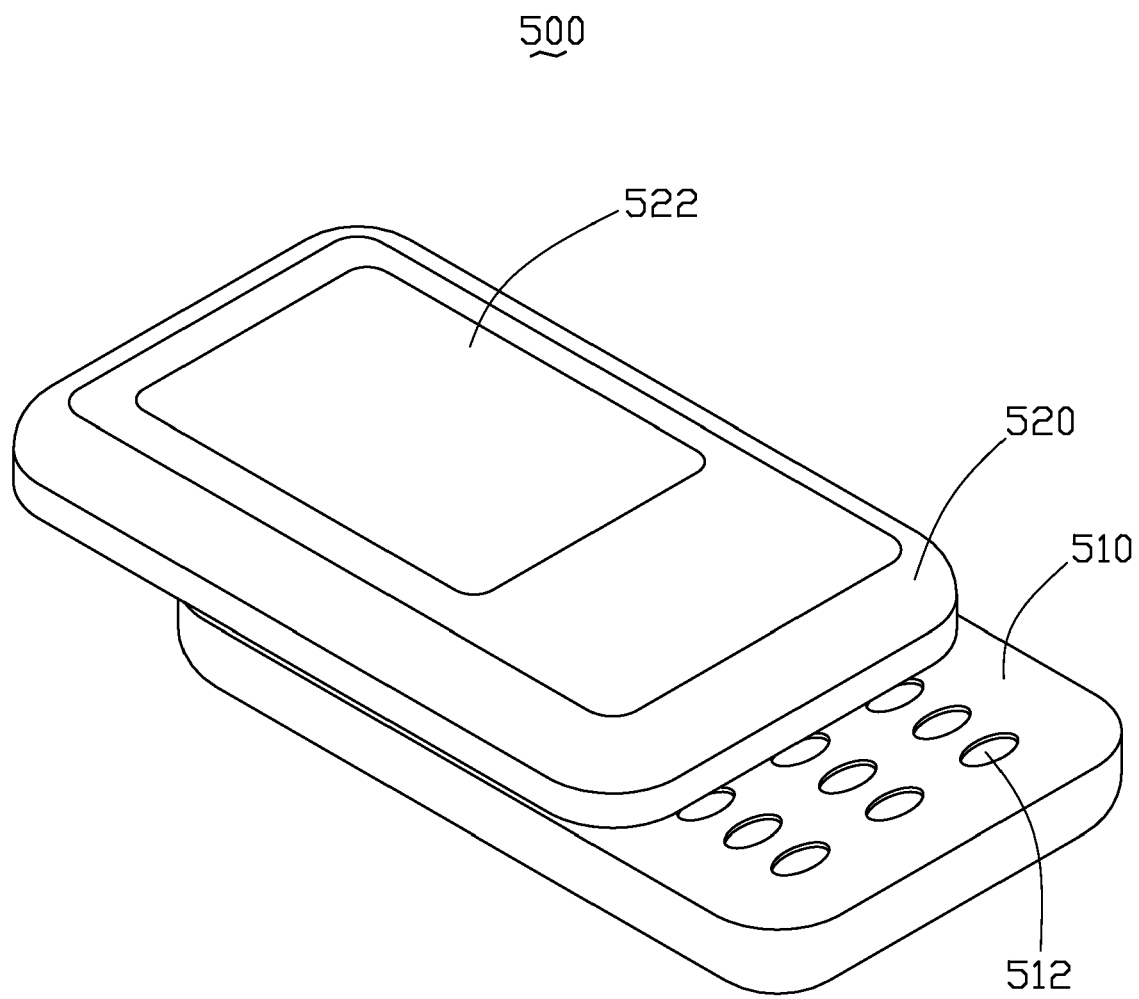
FIG. 2 is an assembled, schematic view of a slide-type portable electronic device with the sliding mechanism shown in FIG. 1 therein.

Referring to FIGS. 1-2, a sliding mechanism 100 is applied to a portable electronic device 500, in accordance with an exemplary embodiment. The electronic device 500 includes a housing 510 and a cover 520 sliding relative to the housing 510 by the sliding mechanism 100. The housing 510 has a plurality of keys 512 thereon. The cover 520 has a display 522 set thereon.

Figure 3:
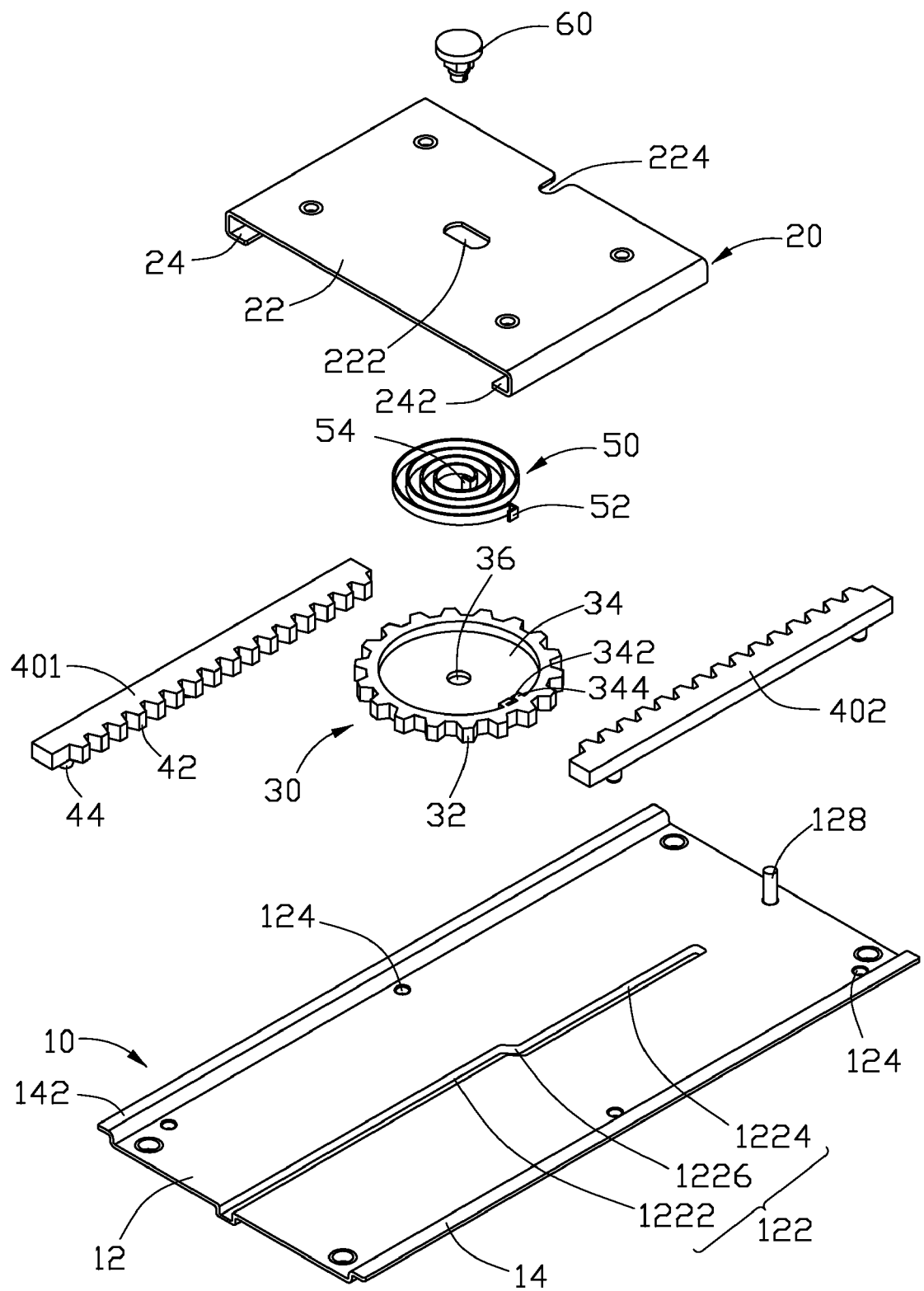
FIG. 3 is an exploded, schematic view of the sliding mechanism shown in FIG. 1.

Referring to FIG. 3, the sliding mechanism 100 includes a main board 10, a sliding board 20, a gear 30, a first rack 401, a second rack 402, a winding coil 50 and a connecting member 60.

The main board 10 has a body 12. The body 12 is substantially a flat board in shape. Two guiding rails 14 are respectively, directly formed at two opposite sides of the body 12. Each guiding rail 14 is substantially L-shaped and includes a horizontal plate 142. The horizontal plates 142 are parallel to the body 12 and extend away from each other. The body 12 defines a guiding slot 122. The guiding slot 122 includes a first straight portion 1222, a second straight portion 1224 and a connecting portion 1226. The first and second straight portions 1222, 1224 are parallel to the guiding rail 14. A small distance is between the first and second straight portions 1222, 1224, and the connecting portion 1226 connects the adjacent ends of the first and second straight portions 1222, 1224. The first straight portion 1222 extends to one end of the body 12. A stop post 128 is formed at another end of the body 12, positioned in line with the second straight portion 1224. Two positioning holes 124 are positioned at each side of the body 12, wherein one positioning hole 124 is corresponding to the connecting portion 1226 of the guiding slot 122, and another one is positioned at one end of the body 12.

The sliding board 20 includes a main plate 22. The width of the main plate 22 is little wider than the body 12 of the main board 10. Two guiding arms 242 are respectively, directly formed at two opposite sides of the main plate 22, extending toward each other. The main plate 22 defines a through hole 222 in a center area thereof, and a cutout 224 at one end thereof. The cutout 224 is configured for receiving the stop post 128.

The gear 30 has a round recess 34 for receiving the winding coil 50. A center hole 36 is defined in a bottom surface of the recess 34. A block 344 vertically extends from a circumferential surface of the recess 34. The block 344 defines an L-shaped aperture 342 for securing one end of the winding coil 50. The gear 30 has a plurality of first teeth 32 formed around the recess 34.

Each rack 401/402 is generally rectangular and has a plurality of second teeth 42 formed at one side thereof. The second teeth 42 are configured for matching the first teeth 32 of the gear 30. Two positioning pins 44 are positioned at a bottom surface of each rack 401/402, configured for engaging with the positioning holes 124. In assembly, a distance between the first rack 401 and the first straight portion 1222 of the guiding slot 122 is similar to that of the second rack 402 and the second straight portion 1224 of the guiding slot 122, which is about half of a diameter of the gear 30.

Figure 4:
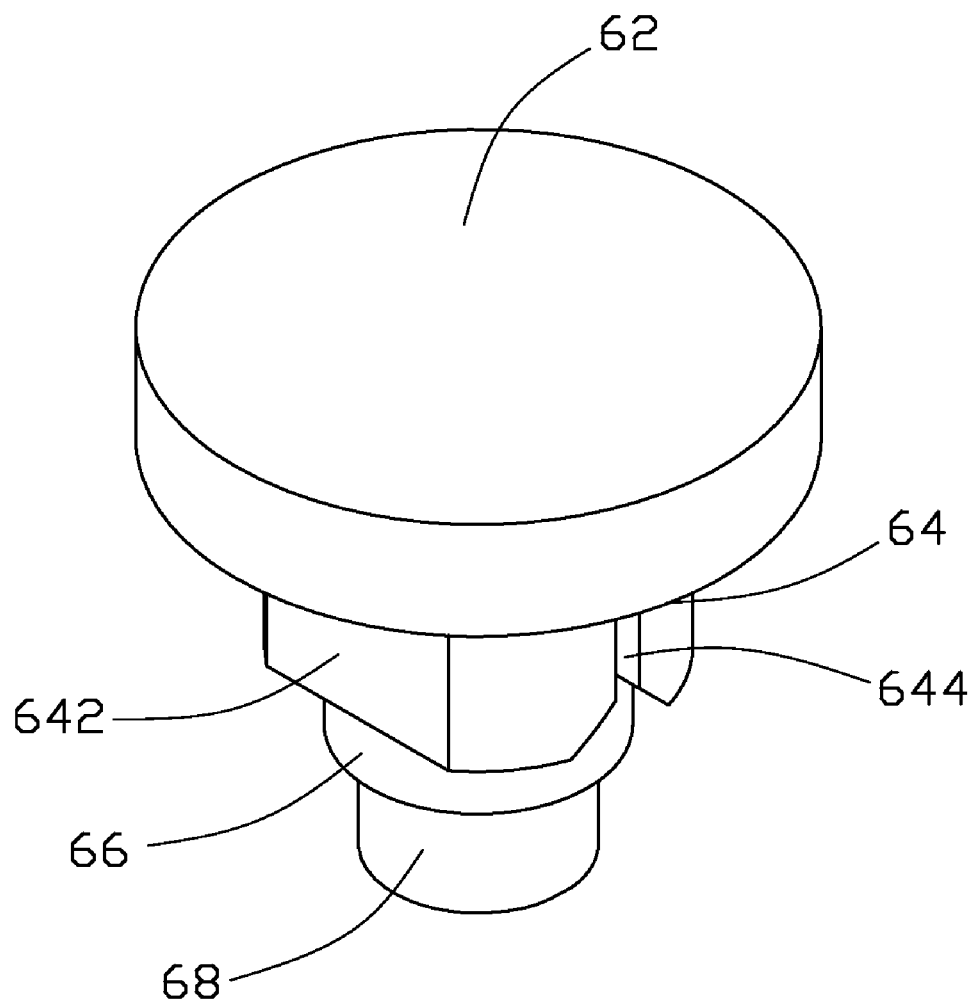
FIG. 4 is a schematic view of a connecting member of the sliding mechanism shown in FIG. 1.

Referring to FIG. 4, the connecting member 60 includes a head 62, a locking portion 64, a first column portion 66 and a second column portion 68, which connect each other in order. The head 62 is circular and has a diameter larger than a width of the through hole 222 of the sliding board 20. The locking portion 64 is generally a column and is cut to form two parallel planes 642. A distance between the two planes 642 is slightly shorter than a width of the through hole 222 of the sliding board 20, and a diameter of the locking portion 64 is smaller than a length of the trough hole 222, so that the locking portion can be received and be slidable in the through hole 222. A gap 644 is defined in an arc surface of the locking portion 64 for securing another end of the winding coil 50. A diameter of the first column portion 66 is smaller than that of the locking portion 64, and is larger than that of the second column portion 68. The first column portion 66 is configured for being received in the center hole 36 of the gear 30. The second column portion 68 is configured for engaging with the guiding slot 122 of the main board 10.

The winding coil 50 has an outer end 52 and an inner end 54. Each of the inner end 54 and the outer end 52 is L-shaped. The inner end 54 is configured for engaging in the gap 644 of the connecting member 60, and the outer end 52 is configured for engaging in the aperture 342 of the gear 30.

In assembly, the first and second racks 401, 402 are attached to the main board 10 by engagement of the positioning pins 44 and the positioning holes 124. The winding coil 50 then is received in the recess 34, with the outer end 52 secured in the aperture 342 of the gear 30. The connecting member 60 is inserted into the through hole 222 of the sliding board 20, and then the inner end 54 of the winding coil 50 is secured in the gap 644 of the connecting member 60. The second column portion 68 of the connecting member 60 then passes the winding coil 50 and the center hole 36 of the gear 30 in order. The locking portion 64 is received in the through hole 222 of the sliding board 20. The sliding board 20 with the gear 30, the winding coil 50 and the connecting member 60 is set at one end of the main board 10, with the cutout 224 thereof facing the guiding slot 122. The guiding arms 242 of the sliding board 20 are pushed to respectively engage with the guiding rails 14 of the main board 10. The second column portion 68 of the connecting member 60 and the gear 30 respectively engages with the guiding slot 122 and the first rack 401.

The sliding board 20 is fixed to the housing 510, and the main board 10 is fixed to the cover 520. Thus, the housing 510 is slidable relative to the cover 520.

Figure 5:
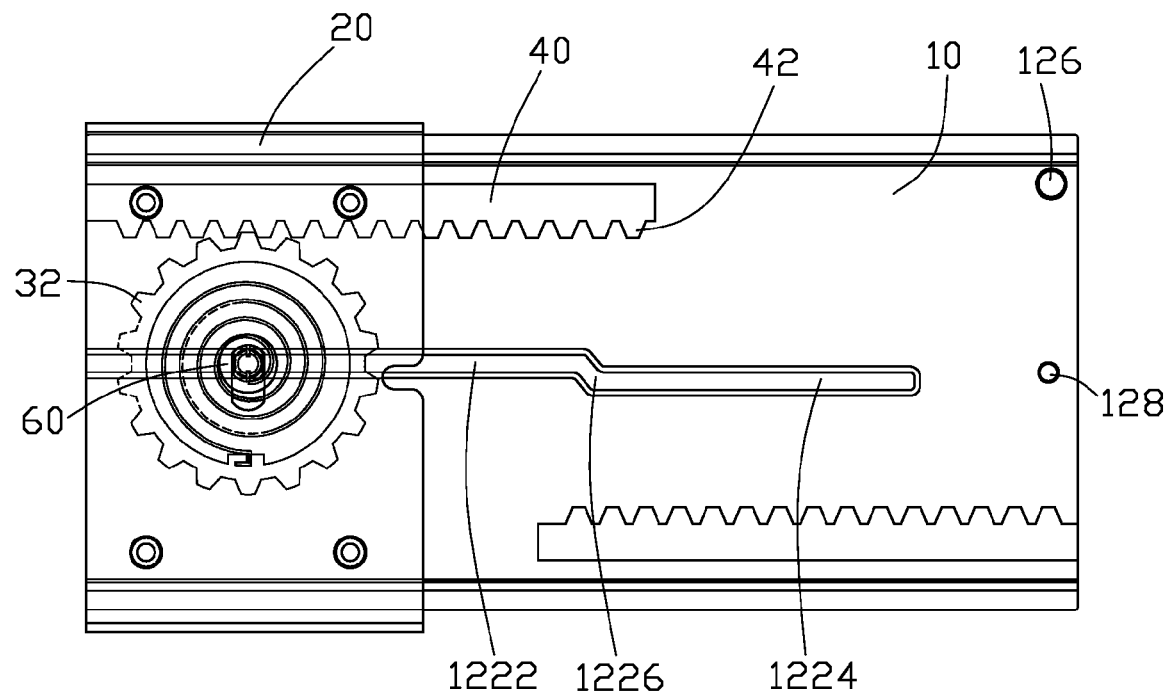
FIG. 5 is an assembled, schematic view of the sliding mechanism shown in FIG. 1, showing a sliding board of the sliding mechanism positioned at a first position.

Referring to FIG. 5, when the electronic device 500 is to be closed, the sliding board 20 is positioned at one end of the main board 10, away from the stop post 128. The gear 30 matches the first rack 401.

Figure 6:
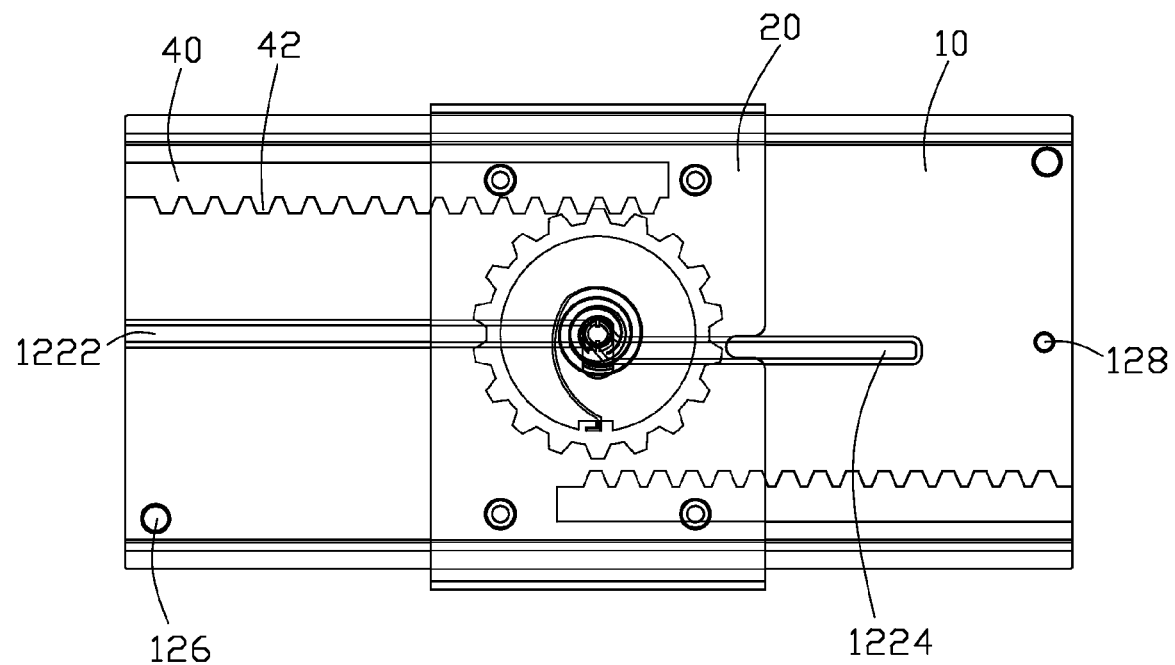
FIG. 6 is similar to FIG. 5, showing the sliding board positioned at a middle position.
Figure 7:
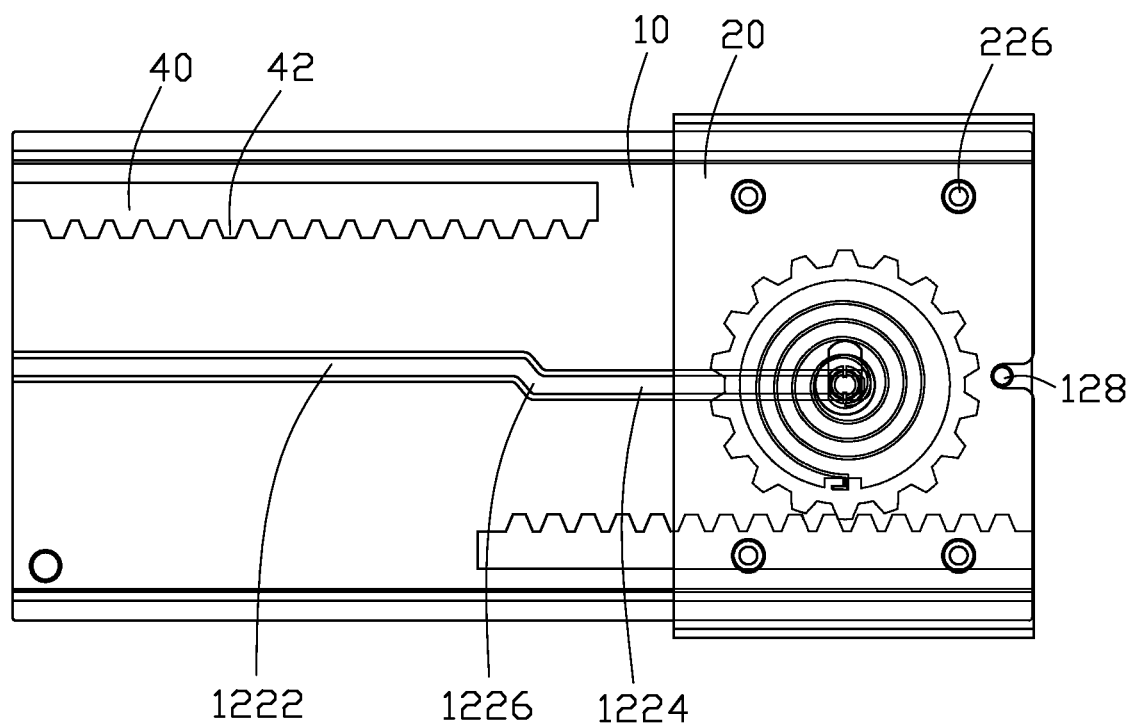
FIG. 7 is similar to FIG. 6, showing the sliding board positioned at a second position.

During opening the electronic device 500, the cover 520 is pushed away from the housing 510, the connecting member 60 slides along the first straight portion 1222 of the guiding slot 122, toward the stop post 128. The gear 30 is rotated by engagement of the first teeth 32 and second teeth 42, and the winding coil 50 is tightened during rotation of the gear 30. Referring to FIG. 6, the connecting member 60 slides along the connecting portion 1226 of the guiding slot 122, the gear 30 is detached from the first rack 401 and then matches the second rack 402. The pressure <?> given on the cover 520 is released. The winding coil 50 rebounds to original shape, bringing the gear 30 to rotate. By engagement of the first teeth 32 and second teeth 42, the gear 30 moves along the second straight portion 1224 of the guiding slot 122, and the cover 520 automatically slides further away from the housing 510. Referring to FIG. 7, the cover 520 is completely open. The stop post 128 is received in the cutout 224 and the cover 520 stops further moving.

When closing the cover 520, the cover 520 is pushed toward the housing 510. The connecting member 60 slides along the second straight portion 1224 of the guiding slot 122. The winding coil 50 is tightened. When the connecting member 60 slides along the connecting portion 1226 of the guiding slot 122, the gear 30 is detached from the second rack 402 and then matches the first rack 401. The pressure <?> given on the cover 520 is released, and the winding coil 50 rebounds to original shape. The cover 520 automatically slides further toward the housing 510 until the cover 520 is completely closed.

It is to be understood that the guiding slot 122 may be a straight slot, and the cover 520 can automatically further sliding relative to the housing 510 by rebounding force of the winding coil 50 when the gear 30 is detached from one rack 401/402 and match another rack 402/401.

It is to be further understood that the stop post 128 and the cutout 224 of the sliding board 20 may be omitted, and the cover 520 may stop further moving by the blind end of the second straight portion 1224 of the guiding slot 122.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A sliding mechanism comprising:
   a main board defining a guiding slot;
   a sliding board;
   two racks positioned at two opposite sides of the main board;
   a gear respectively matching the first and second racks;
   a connecting member connecting the sliding board and the gear, the connecting member including an end engaging in the guiding slot; and
   a winding coil including an inner end and an outer end, the inner end being secured to the connecting member, the outer end being secured to the gear, unwinding of the winding coil causing the sliding board to automatically slide along the guiding slot when the gear is detached from one rack and matches another rack.

2. The sliding mechanism as claimed in claim 1, wherein the guiding slot includes a first straight portion, a second straight portion and a connecting portion, each of the first straight portion and the second straight portion faces one of the racks, the first straight portion and the second straight portion have a distance therebetween, and the connecting portion connects the adjacent ends of the first and second straight portions.

3. The sliding mechanism as claimed in claim 2, wherein a stop post is formed at one end of the main board in line with the second straight portion of the guiding slot, and a cutout is defined in one end of the sliding board for receiving the stop post.

4. The sliding mechanism as claimed in claim 1, wherein the gear has a recess receiving the winding coil, and each rack has a plurality of teeth matching the gear.

5. The sliding mechanism as claimed in claim 4, wherein a block is formed in the recess, and the block defines an aperture for securing the outer end of the winding coil.

6. The sliding mechanism as claimed in claim 5, wherein the connecting member defines a gap for securing the inner end of the winding coil.

7. The sliding mechanism as claimed in claim 6, wherein the connecting member further includes a head and a locking portion, the locking portion is between the head and the end of the connecting member, and the gap is defined in the locking portion.

8. The sliding mechanism as claimed in claim 7, wherein the sliding board defines a through hole for receiving the locking portion, the locking portion is slidable in the through hole, the gear defines a center hole in the bottom of the recess allowing the end of the connecting member to pass.

9. The sliding mechanism as claimed in claim 1, wherein the main board has two guiding rails at two opposite sizes thereof, and the sliding board has two guiding arms respectively engaging with the two guiding rails.

10. A portable electronic device comprising:
    a cover;
    a housing; and a sliding mechanism including:
       a main board fixed to the cover;
       a sliding board fixed to the housing;

two racks positioned at two opposite sides of the main board;

a gear respectively matching the first and second racks;

a connecting member including an end engaging in the guiding slot, the cover being slidable relative to the housing along the guiding slot by the connecting member; and a winding coil including an inner end and an outer end, the inner end being secured to the connecting member, the outer end being secured to the gear, unwinding of the winding coil causing the cover to automatically slide along the guiding slot when the gear is detached from one rack and matches another rack.

11. The portable electronic device as claimed in claim 10, wherein the guiding slot includes a first straight portion, a second straight portion and a connecting portion, each of the first straight portion and the second straight portion faces one of the racks, the first straight portion and the second straight portion have a distance therebetween, and the connecting portion connects the adjacent ends of the first and second straight portion.

12. The portable electronic device as claimed in claim 11, wherein a stop post is formed at one end of the main board in line with the second straight portion of the guiding slot, and a cutout is defined in one end of the sliding board for receiving the stop post.

13. The portable electronic device as claimed in claim 10, wherein the gear has a recess receiving the winding coil.

14. The portable electronic device as claimed in claim 13, wherein a block is formed in the recess, and the block defines an aperture for securing the outer end of the winding coil.

15. The portable electronic device as claimed in claim 14, wherein the connecting member defines a gap for securing the inner end of the winding coil.

16. The portable electronic device as claimed in claim 15, wherein the connecting member further includes a head and a locking portion, the locking portion is between the head and the end of the connecting member, and the gap is defined in the locking portion.

17. The portable electronic device as claimed in claim 16, wherein the sliding board defines a through hole for receiving the locking portion, the locking portion is slidable in the through hole, the gear defines a center hole in the bottom of the recess allowing the the end of the connecting member to pass.

18. The portable electronic device as claimed in claim 17, wherein each rack has a plurality of teeth matching the gear.

19. A sliding mechanism comprising:

a main board;

a sliding board;

two racks positioned at two opposite sides of the main board;

a gear matching each of the first and second racks;

a connecting member, the sliding board being slidable relative to the main board by the connecting member; and a winding coil, the winding coil being tightened when the sliding board is pushed toward or away from the main board, and being rebound to it original shape to cause the sliding board to automatically slide further relative to the main board when the gear is detached from one rack and matches another rack.

20. The sliding mechanism as claimed in claim 19, wherein the each rack has a plurality of teeth matching the gear.

\* \* \* \* \*